(12) United States Patent
Chung et al.

(10) Patent No.: US 10,527,866 B2
(45) Date of Patent: Jan. 7, 2020

(54) CAMERA MODULE PROVIDING OIS FUNCTION AND ELECTRONIC DEVICE COMPRISING THE SAME

(71) Applicant: Samsung Electronics Co., Ltd., Gyeonggi-do (KR)

(72) Inventors: Haein Chung, Gyeonggi-do (KR); Jinwon Lee, Gyeonggi-do (KR); Chongsam Chung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 71 days.

(21) Appl. No.: 15/857,027

(22) Filed: Dec. 28, 2017

(65) Prior Publication Data

US 2018/0180900 A1 Jun. 28, 2018

(30) Foreign Application Priority Data

Dec. 28, 2016 (KR) .......................... 10-2016-0181334

(51) Int. Cl.
*G02B 27/64* (2006.01)
*G03B 5/02* (2006.01)
*G02B 7/00* (2006.01)
*H04N 5/232* (2006.01)

(52) U.S. Cl.
CPC ............. *G02B 27/646* (2013.01); *G02B 7/00* (2013.01); *G03B 5/02* (2013.01); *H04N 5/2328* (2013.01); *G03B 2205/0015* (2013.01)

(58) Field of Classification Search
None
See application file for complete search history.

(56) References Cited

U.S. PATENT DOCUMENTS

| 2009/0051774 | A1 | 2/2009 | Shiraishi | |
| 2011/0019985 | A1 | 1/2011 | Chiu et al. | |
| 2011/0122267 | A1 | 5/2011 | Ahn et al. | |
| 2012/0188441 | A1 | 7/2012 | Takizawa | |
| 2013/0156412 | A1* | 6/2013 | Naito | G03B 5/00 396/55 |
| 2013/0182325 | A1 | 7/2013 | Minamisawa et al. | |
| 2014/0362284 | A1* | 12/2014 | Shin | H04N 5/2254 348/373 |

(Continued)

OTHER PUBLICATIONS

European Search Report dated Apr. 24, 2018 issued in counterpart application No. 17210047.1-1208, 7 pages.

*Primary Examiner* — William B Perkey
(74) *Attorney, Agent, or Firm* — The Farrell Law Firm, P.C.

(57) ABSTRACT

A camera module providing an OIS function is disclosed and includes a camera device configured to rotate in a first direction perpendicular to an optical axis, a first rotation support configured to provide support so that the first direction becomes a central axis for rotating the camera device, and a flexible printed circuit board (FPCB) configured to connect the camera device and the first rotation support physically at two or more separate points. A cross sectional shape of the camera module in the direction of a center point of the central axis is configured so that line segments connecting the center point to the two or more separate points, and the cross sectional shape of the flexible printed circuit board form a closed loop, and at least one line segment connecting two random points in the closed loop passes outside of the closed loop.

20 Claims, 10 Drawing Sheets

(56) References Cited

U.S. PATENT DOCUMENTS

| | | | |
|---|---|---|---|
| 2015/0153539 A1 | 6/2015 | Yoo et al. | |
| 2017/0374247 A1* | 12/2017 | Minamisawa | ............ H01F 5/04 |
| 2018/0180900 A1* | 6/2018 | Chung | ................. G02B 27/646 |
| 2018/0203203 A1* | 7/2018 | Lee | .......................... G02B 7/09 |

* cited by examiner

CAMERA MODULE PROVIDING OIS FUNCTION AND ELECTRONIC DEVICE COMPRISING THE SAME

PRIORITY

This application claims priority under 35 U.S.C. § 119(a) to Korean Patent Application Serial No. 10-2016-0181334, which was filed in the Korean Intellectual Property Office on Dec. 28, 2016, the entire content of which is incorporated herein by reference.

BACKGROUND

1. Field of Disclosure

The present disclosure relates generally to a camera module providing an optical image stabilization (OIS) function and an electronic device comprising the same, and more particularly to a method for reducing a drive load of a circuit board connected to a camera module when the camera module having an OIS function is driven.

2. Description of the Related Art

Due to developments in information and telecommunication technology, and semiconductor technology, the supply and use of electronic devices are rapidly increasing. Current electronic devices tend to have the trend of combining functions that were previously done by separate electronic devices. For example, an electronic device can provide a camera function such that a still image or a moving image is created, and stored on the device after photographing a subject.

In particular, high capacity and high performance cameras are required these days in many applications, and electronic devices having a high performance digital camera (e.g., DSLR) are being introduced.

The camera function provided by an electronic device may include an autofocus function, zoom function, and image stabilization (IS) function.

The IS function may include compensation for a camera or hand shake in order to prevent vibrations from being captured in case the camera is shaken.

Such an image stabilization function may be divided into an optical image OIS function and a digital image stabilization (DIS) function.

An OIS function is a function for compensating an image quality by moving a lens or a camera module in a direction perpendicular to an optical axis.

According to the movement of the lens or the camera module, a drive load can be applied to a circuit board physically connected to the lens or the camera module. In particular, if the drive load is continuously applied, problems may occur due to the printed circuit board deforming or the optical axis of the lens being dislocated.

As an example, camera modules having an optical image stabilization function are commonly connected to a flexible printed circuit board (FPCB) configured with an elastomer. However, if the FPCB is continuously used, a high drive load causes unnecessary power consumption. Therefore, a method for reducing the drive load applied to the circuit board is needed.

In particular, in an electronic device having miniaturization and lightweight characteristics, a camera module and a circuit board connected to the camera module need to be designed considering the space limitation of the electronic device.

SUMMARY

An aspect of the present disclosure is to provide a method for reducing a drive load of a circuit board connected to a camera module that drives the camera module having an OIS function.

According to an aspect of the present disclosure, a camera module providing an OIS function is provided. The camera module includes a camera device configured to rotate in a first direction perpendicular to an optical axis; a first rotation support configured to provide support so that the first direction becomes a central axis for rotating the camera device; and a flexible printed circuit board (FPCB) configured to connect the camera device and the first rotation support physically at two or more separate points. A cross sectional shape of the camera module in the direction of the central axis is configured so that line segments connecting the center point to the two or more separate points, and a cross sectional shape of the flexible printed circuit board form a closed loop, and at least one line segment connecting two random points in the closed loop passes outside of the closed loop.

According to an aspect of the present disclosure, an electronic device is provided, including a camera module including a camera device configured to rotate in a first direction perpendicular to an optical axis, a first rotation support configured to provide support so that the first direction becomes a central axis for rotating the camera device, and a flexible printed circuit board (FPCB) configured to connect the camera device and the first rotation support physically at two or more separate points. A cross sectional shape of the camera module in the direction of a center point of the central axis is configured so that line segments connecting the center point to the two or more separate points, and a cross sectional shape of the flexible printed circuit board form a closed loop, and at least one line segment connecting two random points in the closed loop passes outside of the closed loop.

BRIEF DESCRIPTION OF THE DRAWINGS

The above and other aspects, features, and advantages of embodiments of the present disclosure will be more apparent from the following description taken in conjunction with the accompanying drawings, in which.

DETAILED DESCRIPTION

Figure 1:
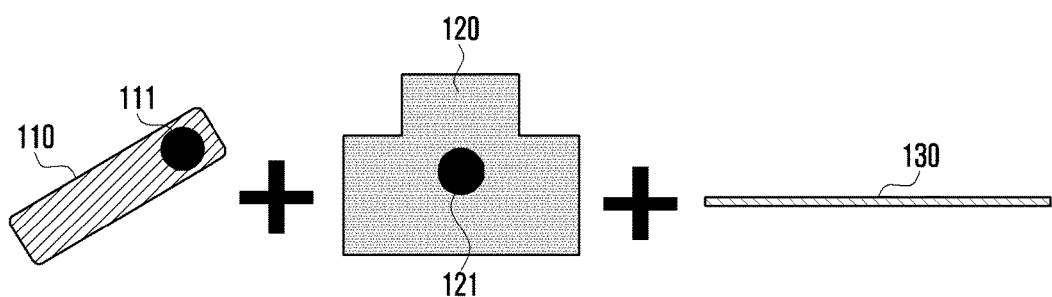
FIG. 1 schematically illustrates a camera module according to various embodiments of the present disclosure.

It should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., a numeral, a function, an operation, a component, or a constituent element), and do not exclude one or more additional features.

In the present disclosure, the expressions "A or B", "at least one of A and/or B", or "one or more of A and/or B" may include all possible combinations of the items listed. For example, the expressions "A or B", "at least one of A and B", or "at least one of A or B" refer to all of (1) including at least one A, (2) including at least one B, or (3) including all of at least one A and at least one B.

The expressions "a first", "a second", "the first", or "the second" used in various embodiments of the present disclosure may modify various components regardless of the order and/or the importance, and do not limit the corresponding components. For example, a first user device and a second user device indicate different user devices although both of them are user devices. As another example, a first element may be referred to as a second element, and similarly, a second element may be referred to as a first element without departing from the scope of the present disclosure.

It should be understood that when an element (e.g., first element) is referred to as being (operatively or communicatively) "connected" or "coupled" to another element (e.g., second element), it may be directly connected or directly coupled to the other element, or any other element (e.g., third element) may be interposed between them. In contrast, it is understood that when an element (e.g., first element) is referred to as being "directly connected" or "directly coupled" to another element (e.g., second element), there is no other element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary may be interpreted to have the same meanings the contextual meanings in the relevant field of art, and are not to be interpreted to have ideal or excessively formal meanings unless clearly defined in the present disclosure. In some cases, even terms defined in the present disclosure are not to be interpreted to exclude embodiments of the present disclosure.

In the present disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a portable medical device, a digital camera, or a wearable device (e.g., a head-mounted device (HMD) such as electronic glasses, electronic clothes, an electronic bracelet, an electronic necklace, an electronic accessory, an electronic tattoo, a smart mirror, or a smart watch).

According to an embodiment of the present disclosure, the electronic device may include at least one of various medical devices (e.g., portable medical measuring devices (e.g., a blood glucose monitoring device, a heart rate monitoring device, a blood pressure measuring device, a body temperature measuring device, etc.), a magnetic resonance angiography (MRA) apparatus, a magnetic resonance imaging (MRI) apparatus, a computed tomography (CT) machine, and an ultrasonic machine), a navigation device, a global positioning system (GPS) receiver, an event data recorder (EDR), a flight data recorder (FDR), vehicle infotainment devices, electronic devices for a ship (e.g., a navigation device, and a gyro-compass), avionics, security devices, an automotive head unit, a robot for home or industry, an automatic teller machine (ATM), a point of sales (POS) device, or Internet of things (IoT) device (e.g., a light bulb, various sensors, electric or gas meter, a sprinkler device, a fire alarm, a thermostat, a streetlamp, a toaster, sporting equipment, a hot water tank, a heater, a boiler, etc.)

According to various embodiments of the present disclosure, an electronic device may be furniture or part of a building having a communication function, an electronic board, an electronic signature receiving device, a projector, or various measuring instruments (e.g., a water meter, an electric meter, a gas meter, a wave meter, etc.). An electronic device may be one of the above-mentioned devices or any combination thereof.

As used herein, the term "user" may indicate a person who uses an electronic device or a device (e.g., an artificial intelligence electronic device) that uses an electronic device.

FIG. 1 schematically illustrates a camera module according to various embodiments of the present disclosure.

The camera module providing an optical image stabilization function according to various embodiments of the present disclosure may include a camera device 120, rotation support 110, and FPCB 130. The camera module may omit at least one of the components or include other additional components.

The rotation support 110 may form a central axis 111 needed for rotating the camera device 120 in a direction perpendicular to an optical axis. According to an embodiment of the present disclosure, one camera device 120 can rotate in a plurality of directions using a plurality of rotation supports 110. For example, if a first rotation support forming a rotation central axis in a pitch direction and a second rotation support forming a rotation central axis in a yaw direction are combined with a camera device, the camera device can cover 360 degrees on a surface perpendicular to an optical axis (e.g., X-axis).

The camera device 120 is a device for capturing a still image or a moving image, and, according to an embodiment of the present disclosure, may include at least one image sensor, lens, image signal processor (ISP), or flash (e.g., LED or xenon lamp). The image sensor may include image sensors of various types such as a charge coupled device (CCD) or CMOS image sensor (CIS) which can capture an image continuously in real time. A rotation center axis 121 of the camera device 120 is combined with a central axis 111 on the rotation support 110, and it allows the rotation of the camera device.

The FPCB 130 is electrically connected to the camera device 120 and the rotation support 110, and can transmit a drive signal to them. According to an embodiment of the present disclosure, the camera device 120 and the rotation support 110 can be physically connected to two or more separate parts. In particular, a drive load according to the rotation of the camera device 120 can be applied to the parts physically connected to the camera device 120.

Figure 2:
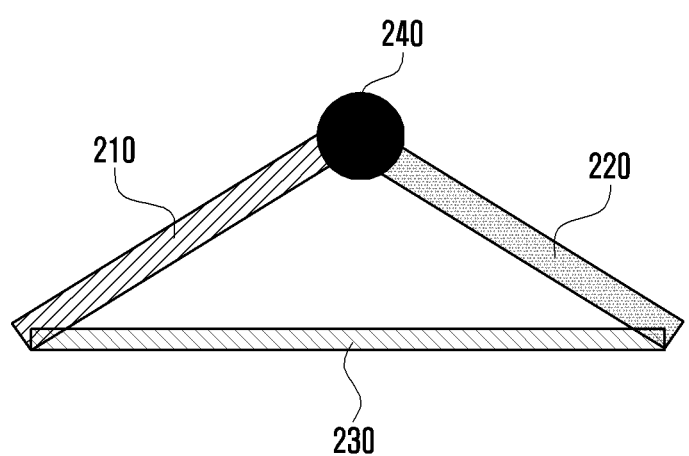
FIG. 2 schematically illustrates a mechanical structure of a camera module according to various embodiments of the present disclosure.

FIG. 2 schematically illustrates a mechanical structure of a camera module according to various embodiments of the present disclosure.

The camera module providing an OIS function may include a camera device 220 rotating based on a first direction perpendicular to an optical axis, a first rotation support 210 supporting so that the first direction becomes a central axis of the rotating camera device 220, and a FPCB 230 physically connected to the camera device 220 and the first rotation support 210 at two or more separate points.

FIG. 2 illustrates a cross-sectional structure of the camera module shown at a specific direction by interpreting kinematics. Through the kinematic interpretation, a drive load applied to the FPCB 230 can be examined.

If the cross section of the camera module is shown in a direction perpendicular to a central axis, the central axis may look like a center point 240. The center point 240 can be interpreted as a connecting point or combining point between the camera device 220 and the first rotation support 210, and the camera device 220 can rotate based on the center point 240.

The camera device 220 and the first rotation support 210 can be physically connected to a FPCB 230. In particular, the camera device 220 and the first rotation support 210 can be connected to two or more separate points on the FPCB 230.

Based on such a structure, the camera device 220 and the first rotation support 210 can be understood as a bar mechanism physically connected to the FPCB 230. For example, each line segment from the center point 240 to the two or more separate points may be understood as indicating the camera device 220 and the first rotation support 210.

In more detail, the camera device 220 rotates based on the fixed center point 240, and parts physically connected to the FPCB 230 can move together according to the rotation of the camera module. Namely, if the connecting points of the camera device 220 and the first rotation support 210 are known, a drive load of the FPCB 230 can be estimated.

The camera device 220 and the first rotation support 210 can be indicated as a bar mechanism or a line segment, and if a cross sectional shape of the FPCB 230 is combined with them, a closed loop can be formed. For example, if the FPCB 230 is a plate type, the camera module can be understood as a triangular cross sectional structure as shown in FIG. 2. However, in a camera module having a triangular cross sectional structure, the camera device 220 cannot actually rotate because the elasticity of the FPCB 230 is not provided. Namely, the camera device 220 must have at least one bent part in order to receive the elasticity of the FPCB 230.

Figure 3A:
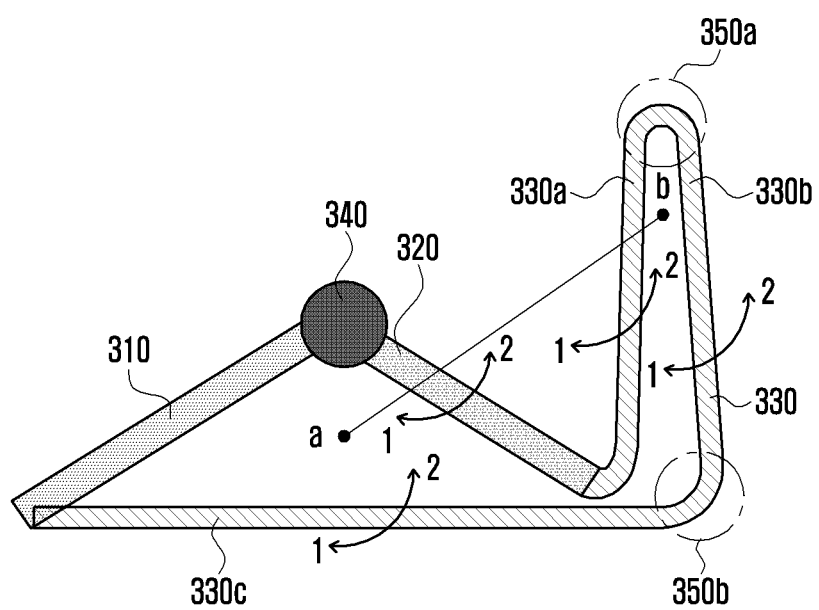
FIGS. 3A to 3C schematically illustrate a mechanical structure of a camera module according to various embodiments of the present disclosure.
Figure 3B:
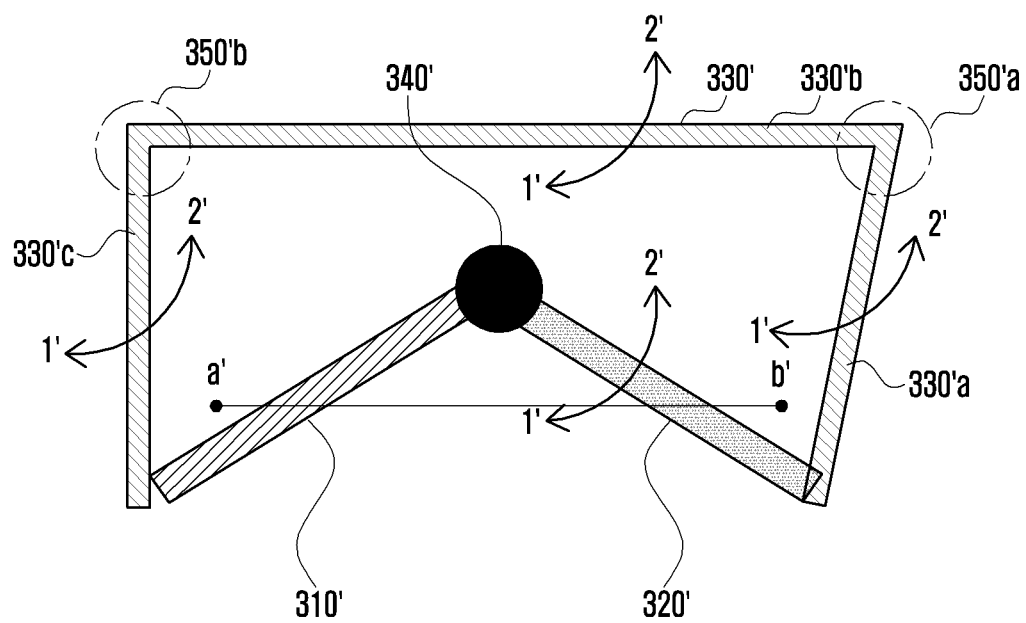
Figure 3C:
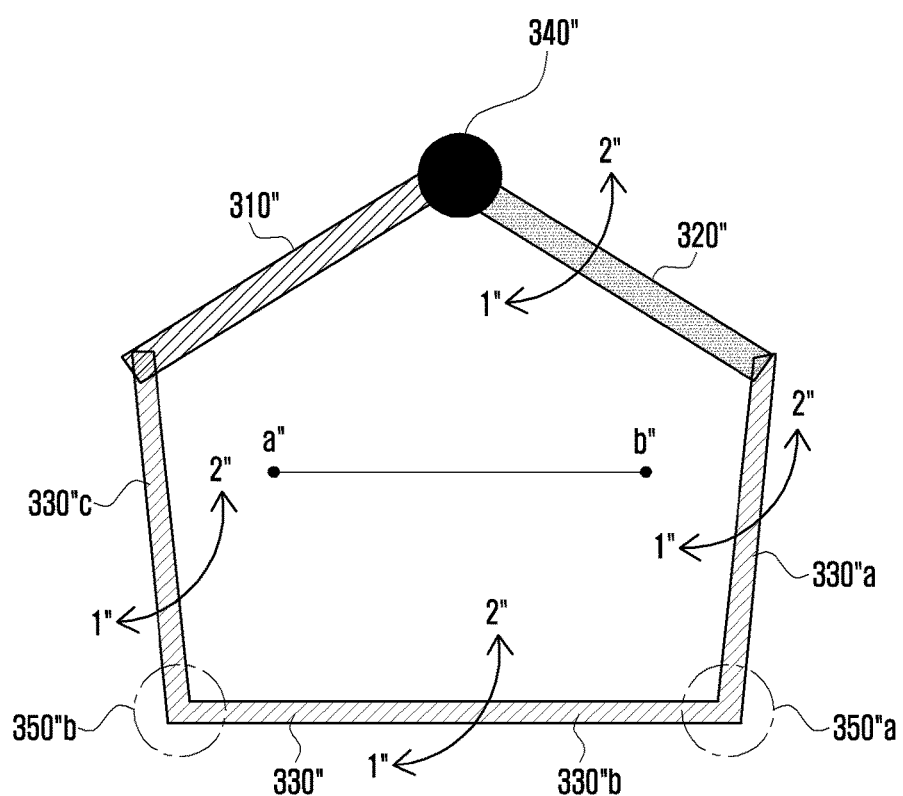

FIGS. 3A to 3C schematically illustrate a mechanical structure of a camera module according to various embodiments of the present disclosure.

FIGS. 3A to 3C illustrate a mechanism of the camera module and a FPCB 330 having at least one bent part. The camera device 320 can rotate in a certain angle range by using an elasticity of the at least one bent part. For example, an angle displacement can be generated at the at least one bent part according to the rotation of the camera device 320, and the FPCB 330 can take the role of an elastomer according to the generated angular displacement. As the angular displacement increases, the elasticity becomes stronger, and as the elasticity becomes stronger, a drive load of the FPCB 330 may increase.

Hereinafter, a combined shape of the camera device 320 and the first rotation support 310 is defined as a first structure, and a shape of the FPCB 330 is defined as a second structure.

FIG. 3A illustrates FPCB 330 having at least one curve point. A closed loop can be formed by combing both ends of the first structure and the second structure at two or more separate points. The first curve point 350a and the second curve point 350b have an angular displacement and can provide an elasticity for the camera device 320.

The second structure may be divided into a first section 330a connecting from the first curve point 350a to the camera device 320, second section 330b connecting from the first curve point 350a to the second curve point 350b, and third section 330c connecting from the second curve point 350b to the first rotation support 310. For example, camera device 320 can rotate in a direction 1 or direction 2 based on the center point 340. Here, each section can provide an elasticity for the camera device 320 by moving in the direction 1 or direction 2 according to the rotation of the camera device 320. An angular displacement can be generated at each curve point due to the ability of each section to move in a different direction.

According to various embodiments of the present disclosure, the closed loop formed by connecting the first structure and the second structure may be configured so that at least one line segment passes outside of the closed loop when two random points in the closed loop are connected with the line segment. For example, a line segment connecting point a and point b passes outside of the closed loop. The closed loop satisfying this condition can be defined as a "concave closed loop". Because the curve point of the concave closed loop has a smaller angular displacement than the curve point of a convex closed loop, the drive load transmitted to the FPCB 330 can be reduced. For example, the curve point of the concave closed loop may require an angular displacement within 90 degrees to rotate the camera device 320 to 90 degrees; however, the curve point of the convex closed loop may require an angle displacement greater than 90 degrees. FIG. 3B and FIG. 3C show a substantial difference.

FIGS. 3B and 3C illustrate a shape from which an angular displacement of the curve point can be compared.

FIG. 3B illustrates a concave closed loop of which a line segment connecting point a' and point b' passes outside of the closed loop. For example, if the camera device 320' rotates in a direction 1', each section moves according to the rotation of the camera device 320', an angle of a first curve point 350a' becomes gradually larger, and an angle of a second curve point 350'b becomes gradually smaller. Conversely, if the camera device 320' rotates in a direction 2', an angle of the first curve point 350'a becomes gradually smaller and an angle of the second curve point 350'b becomes gradually larger. However, in the concave closed loop shown in FIG. 3B, if it is assumed that the camera device rotates about 90 degrees, the first curve point 350'a and the second curve point 350'b have a smaller angle displacement. This will become more apparent by examining the convex closed loop shown in FIG. 3C.

FIG. 3C illustrates a convex closed loop of which a line segment connecting point a" and point b" does not pass outside of the closed loop. The camera device 320" can rotate in a direction 1" or direction 2". For example, if the camera device 320" rotates in a direction 1", each section moves according to the rotation of the camera device 320", an angle of a first curve point 350"a becomes gradually smaller, and an angle of a second curve point 350"b becomes gradually larger. Adversely, if the camera device 320" rotates in a direction 2", an angle of the first curve point 350"a becomes gradually larger and an angle of the second curve point 350"b becomes gradually smaller. If it is assumed that the camera device 320" rotates about 90 degrees as shown in FIG. 3B, the first curve point 350"a and the second curve point 350"b have a larger angular displacement than the curve point of the concave closed loop. Namely, the concave closed loop has a smaller drive load than the convex closed loop.

Figure 4:
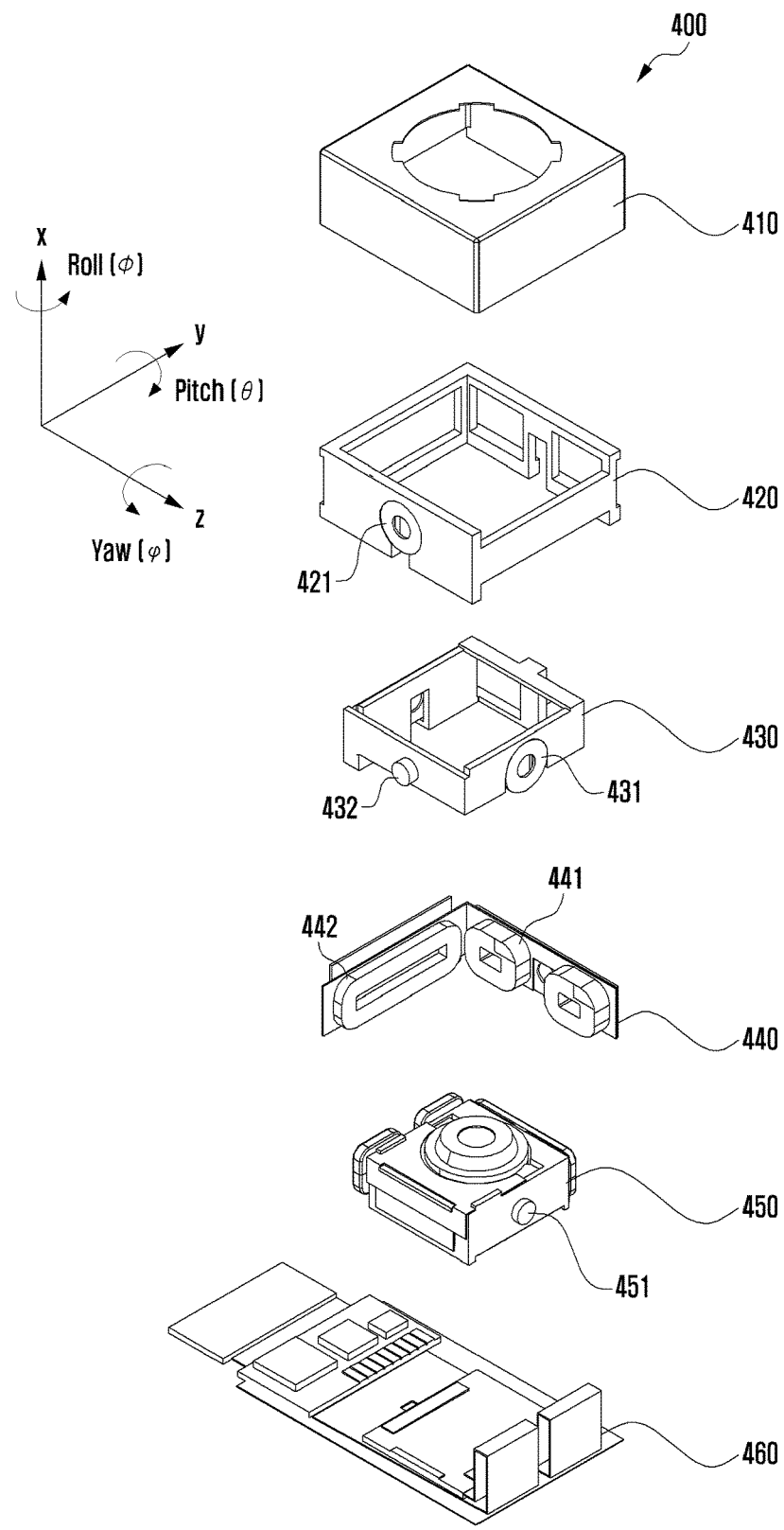
FIG. 4 illustrates an exploded perspective view of a camera module providing an OIS function according to various embodiments of the present disclosure.

FIG. 4 illustrates an exploded perspective view a camera module providing an OIS function according to various embodiments of the present disclosure.

The camera module 400 providing an OIS function may include a housing 410, first rotation support 420, second rotation support 430, actuator 440, camera device 450, and FPCB 460. The camera module may omit at least one of the components or include other additional components.

The housing 410 may be configured to accommodate the first rotation support 420, second rotation support 430, actuator 440, and camera device 450, and to protect the components from an external impact. According to an embodiment of the present disclosure, the housing 410 can surround the above components with a closed wall except for an opening where a camera lens is located to photograph an external subject.

The first rotation support 420 is combined with the second rotation support 430 and forms a central axis so that the camera device 450 can rotate in a direction perpendicular to an optical axis (e.g., pitch direction). For example, a first support 421 formed in the first rotation support 420 can be combined with a first hinge 432 formed in the second rotation support 430. The first rotation support 420 becomes a base structure and provides support so that the second rotation support 430 can rotate.

The second rotation support 430 is combined with the camera device 450 and forms a central axis so that the camera device 450 can rotate in a direction perpendicular to an optical axis direction (e.g., yaw direction). For example, a second support 431 formed in the second rotation support 430 can be combined with a second hinge 451 formed in the camera device 450. The second rotation support 430 provides support so that the camera device 450 can rotate. For example, if the first rotation support 420 forming a rotation central axis in a pitch direction and the second rotation support 430 forming a rotation central axis in a yaw direction are combined with one camera device 450, the camera device 450 can rotate in all directions based on a surface perpendicular to the optical axis (e.g., X-axis).

The actuator 440 can provide a rotation drive power for the camera device 450. The actuator 440 may include a voice coil motor (VCM), a step motor, a piezo motor, or a capacitance-type actuator. The capacitance-type actuator 440 may include a first electrode 442 facing a Y-axis side of the camera device 450 and a second electrode 441 facing a Z-axis side of the camera device 450 as an opposite electrode to the first electrode. The camera device 450 can receive a rotation drive power by disposing each electrode included in the actuator 440 and each opposite electrode at corresponding locations. Namely, the camera device 450 can be controlled in a pitch direction and a yaw direction at the same time by controlling an electric current being supplied to the actuator 440. The camera device 450 can rotate in all directions based on a surface perpendicular to an optical axis (e.g., X-axis) because the rotations in the pitch direction and the yaw direction rotation are controlled at the same time.

The camera device 450 is a device for capturing a still image or a moving image and, according to an embodiment of the present disclosure, may include at least one image sensor, lens, -ISP, or flash (e.g., LED or xenon lamp). The image sensor may include image sensors of various types such as a CCD or CIS, and it can capture an image continuously in real time. The camera device 450 may include a printed circuit board (PCB), and the PCB can transmit a control signal of the camera device 450 by connecting physically and electrically to the FPCB 460.

For example, the FPCB 460 can transmit a drive signal to the camera device 450 and the actuator 440 by connecting to them electrically. The FPCB 460 provides an elasticity for the camera device 450, and the camera device 450 can rotate in a certain angular displacement by using the elasticity. As the angular displacement increases, the elasticity becomes larger, and as the elasticity becomes larger, a drive load generated in the FPCB 460 becomes larger.

Figure 5A:
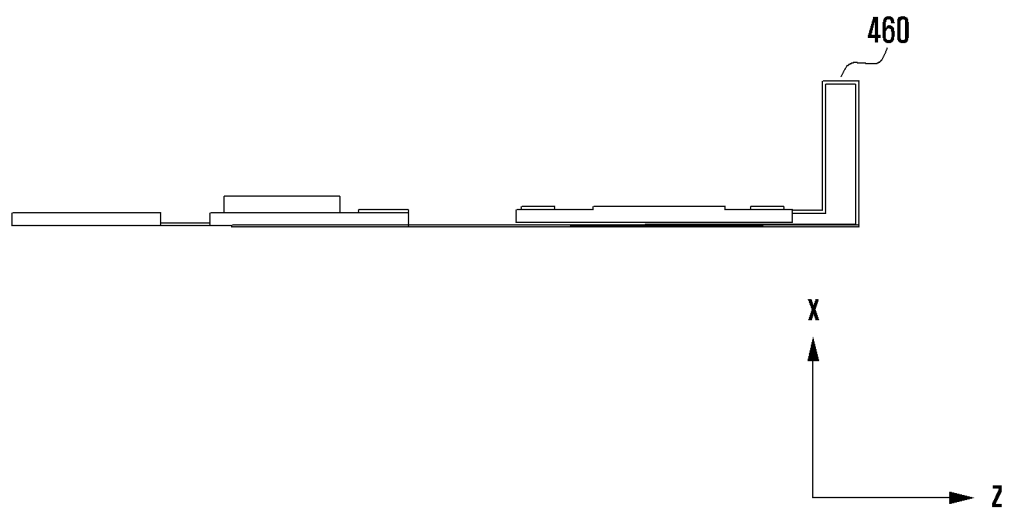
FIGS. 5A and 5B illustrate an FPCB according to various embodiments of the present disclosure.
Figure 5B:
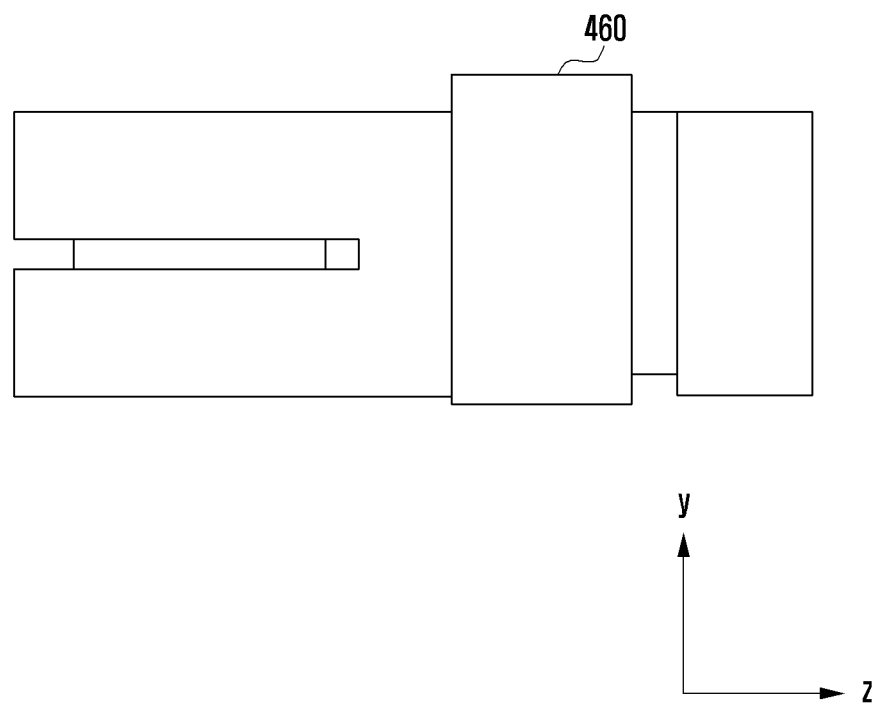

FIGS. 5A and 5B illustrate a FPCB 460 according to various embodiments of the present disclosure.

FIG. 5A illustrates a FPCB 460 shown in a Y-axis direction. For example, a camera device 450 rotating based on a first hinge 432 of a second rotation support 430 can form a central axis in a pitch direction. The first rotation support 420 and the camera device 450 may be integrated with the FPCB 460 at two or more separate points. If a cross sectional structure of the camera module 400 is interpreted mechanically as described in FIG. 2, the cross sectional structure is formed with a closed loop having at least one curve point. If two random points in the closed loop are connected with at least one line segment, the line segment can pass outside of the closed loop. Namely, the FPCB 460 forming a concave closed loop has a small angular displacement at each curve point, and a drive load transmitted to the FPCB 460 can be reduced.

FIG. 5B illustrates a FPCB 460 shown in a X-axis direction. For example, the camera device 450 rotating based on a second hinge 451 of the camera device 450 can form a central axis in a yaw direction. The second rotation support 430 and the camera device 450 are combined with the FPCB 460 at two or more separate points. If a cross sectional structure of the camera module 400 is interpreted mechanically as described in FIG. 2, the cross sectional structure is formed with a closed loop having at least one curve point. If two random points in the closed loop are connected with at least one line segment, the line segment can pass outside of the closed loop. Namely, the FPCB 460 forming a concave closed loop has a small angular displacement at each curve point, and a drive load transmitted to the FPCB 460 can be reduced.

By using the FPCB 460 illustrated in FIGS. 5A and 5B, a first rotation support 420 forming a rotation central axis in a pitch direction and a second rotation support 430 forming a rotation central axis in a yaw direction can be combined with one camera device 450, and the camera device 450 can cover all directions based on a surface perpendicular to an optical axis (e.g., X-axis).

A camera module providing an OIS function according to various embodiments of the present disclosure includes a camera device configured to rotate based on a first direction perpendicular to an optical axis, a first rotation support configured to support so that the first direction becomes a central axis for rotating the camera device, and an FPCB configured to connect the camera device and the first rotation support physically at two or more separate points. The cross sectional shape of the camera module shown in the direction of the center point of the central axis is configured so that line segments connecting the center point to the two or more separate points and the cross sectional shape of the FPCB form a closed loop, and at least one line segment connecting two random points in the closed loop passes outside the closed loop.

In the camera module providing an OIS function according to various embodiments of the present disclosure, the cross sectional shape of the flexible circuit board may include at least one curve point.

In the camera module providing an OIS function according to various embodiments of the present disclosure, the curve point can apply an elasticity to the camera device.

The camera module providing an OIS function according to various embodiments of the present disclosure may further include a second rotation support configured to provide support so that a second direction perpendicular to the first direction and the optical axis becomes a central axis for rotating the camera device.

In the camera module providing an OIS function according to various embodiments of the present disclosure, the camera device can rotate based on the second direction.

In the camera module providing an OIS function according to various embodiments of the present disclosure, the first rotation support may include a first support connecting to a first hinge formed in the second rotation support.

In the camera module providing an OIS function according to various embodiments of the present disclosure, the second rotation support may include a second support connecting to a second hinge formed in the camera device.

The camera module providing an OIS function according to various embodiments of the present disclosure may further include an actuator configured to provide a rotational drive power to the camera device.

In the camera module providing an OIS function according to various embodiments of the present disclosure, the actuator may include at least one of a VCM, step motor, piezo motor, and capacitance-type actuator.

In the camera module providing an OIS function according to various embodiments of the present disclosure, the capacitance-type actuator may include at least two opposite electrodes.

Figure 6:
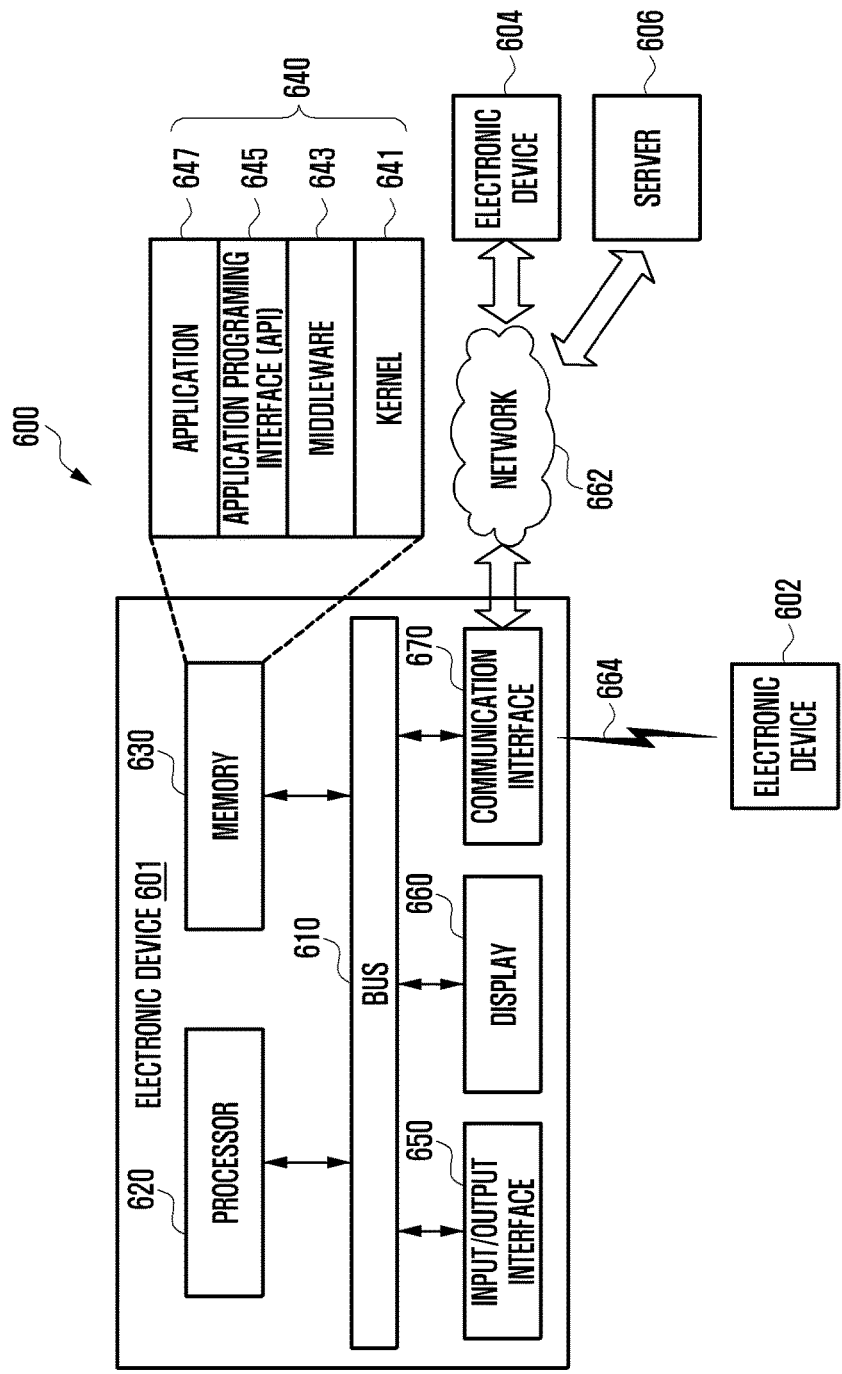
FIG. 6 illustrates a block diagram of an electronic device in a network environment according to various embodiments of the present disclosure.

FIG. 6 illustrates a block diagram of a network environment including an electronic device according to various embodiments of the present disclosure.

Referring to FIG. 6, an electronic device 601, in a network environment 600, includes a bus 610, a processor 620, a memory 630, an input/output interface 650, a display 660, and a communication interface 670. According to an embodiment of the present disclosure, the electronic device 601 may omit at least one of the components or further include another component.

The bus 610 may be a circuit connecting the above described components and transmitting communication (e.g., a control message) between the above described components.

The processor 620 may include one or more of a CPU, an AP or a communication processor (CP). For example, the processor 620 may control at least one component of the electronic device 601 and/or control communication or data processing.

The memory 630 may include volatile and/or non-volatile memory. For example, the memory 630 may store a command or data relating to at least one component of the electronic device 601. According to an embodiment of the present disclosure, the memory 630 may store software and/or a program 640. For example, the program 640 may include a kernel 641, middleware 643, an application programming interface (API) 645, an application 647, etc. At least one portion of the kernel 641, the middleware 643 and the API 645 may be defined as an operating system (OS).

The kernel 641 controls or manages system resources (e.g., the bus 610, the processor 620, or the memory 630) used for executing an operation or function implemented by the remaining other program, for example, the middleware 643, the API 645, or the application 647. Further, the kernel 641 provides an interface for accessing individual components of the electronic device 601 from the middleware 643, the API 645, or the application 647 to control or manage the components.

The middleware 643 performs a relay function of allowing the API 645 or the application 647 to communicate with the kernel 641 to exchange data. Further, in operation requests received from the application 647, the middleware 643 performs a control for the operation requests (e.g., scheduling or load balancing) by using a method of assigning a priority, by which system resources (e.g., the bus 610, the processor 620, the memory 630 and the like) of the electronic device 601 may be used, to the application 647.

The API 645 is an interface by which the application 647 may control a function provided by the kernel 641 or the middleware 643 and includes, for example, at least one interface or function (e.g., command) for file control, window control, image processing, or character control.

The input/output interface 650 may be an interface that transmits commands or data input by a user or another external device to another component(s) of the electronic device 601. Further, the input/output interface 650 may output the command or data received from another component(s) of the electronic device 601 to the user or another external device.

The display 660 may include, for example, a liquid crystal display (LCD), a light emitting diode (LED), an organic LED (OLED), a micro electro mechanical system (MEMS) display, or an electronic paper display. The display 660 may display, for example, various contents (e.g., text, image, video, icon, or symbol, and etc.) to a user. The display 660 may include a touch screen, and receive touch, a gesture, and an approaching or hovering input using a part of a user's body.

The communication interface 670 may allow communication of the electronic device 601 to an external device (e.g., a first external electronic device 602, a second external electronic device 604, or a server 606). For example, the communication interface 670 may be connected with the network 662 through wireless communication or wired communication, and communicate with the external device.

Wireless communication may use, as a cellular communication protocol, at least one of long-term evolution (LTE), LTE Advance (LTE-A), code division multiple access (CDMA), wideband CDMA (WCDMA), universal mobile telecommunications system (UMTS), Wireless Broadband (WiBro), global system for mobile communications (GSM), etc. A short-range communication 664 may include, for example, at least one of Wi-Fi, Bluetooth, near field communication (NFC), Global Navigation Satellite System (GNSS), etc.

The global navigation satellite system (GNSS) may include at least one of, for example, a GPS, a global navigation satellite system (Glonass), a Beidou navigation satellite system (Beidou), Galileo, the European global satellite-based navigation system, etc. Hereinafter, the term "GPS" may be interchangeably used with the term "GNSS" in the present disclosure. Wired communication may include, for example, at least one of universal serial bus (USB), high definition multimedia interface (HDMI), recommended standard-232 (RS-232), plain old telephone service (POTS), etc. The network 662 may include a telecommunication network, for example, at least one of a computer network (e.g., LAN or WAN), Internet, and a telephone network.

Each of the first external device 602 and the second external device 604 may be the same type or a different type of device than the electronic device 601. According to some embodiment of the present disclosure, the server 606 may include one or more groups of servers. At least one portion of functions executed by the electronic device 601 may be performed by one or more electronic devices (e.g., external electronic device 602, 604, or server 606). When the electronic device 601 performs a function or service, the electronic device 601 may request performing of at least one function to another device (e.g., external electronic device 602 or 604, or server 606). For example, cloud computing technology, distributed computing technology, or client-server computing technology may be used.

Figure 7:
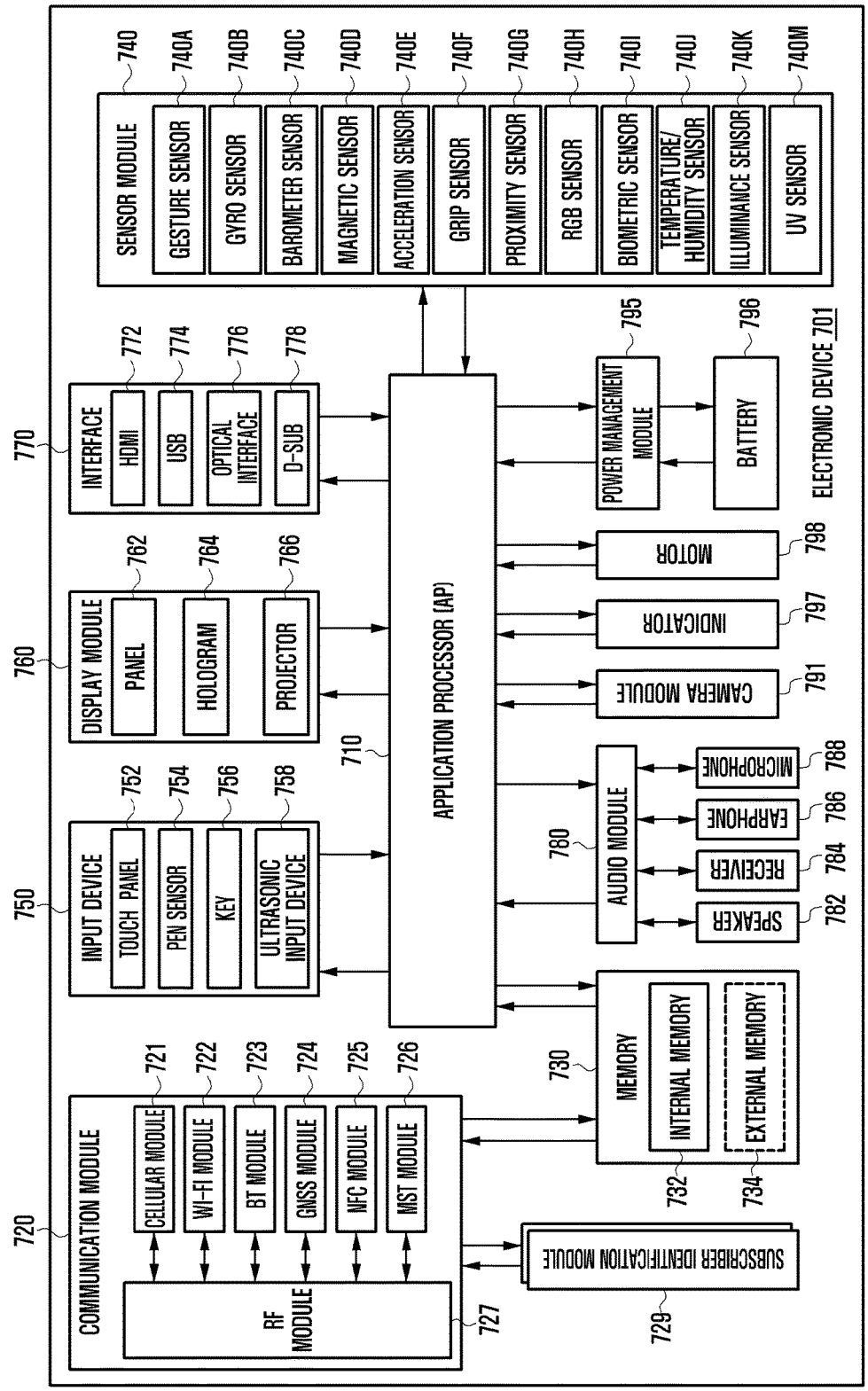
FIG. 7 illustrates a block diagram illustrating a configuration of an electronic device according to various embodiments of the present disclosure.

FIG. 7 illustrates a block diagram of an electronic device according to an embodiment of the present disclosure.

Referring to FIG. 7, the electronic device 701 includes one or more APs 710, a communication module 720, a subscriber identification module (SIM) 729, a memory 730, a sensor module 740, an input device 750, a display module 760, an interface 770, an audio module 780, a camera module 791, a power managing module 795, a battery 796, an indicator 797, and a motor 798.

The AP 710 operates an OS or an application program so as to control a plurality of hardware or software component elements connected to the AP 710, and executes various data processing and calculations including multimedia data. The AP 710 may be implemented by, for example, a system on chip (SoC). According to an embodiment of the present disclosure, the AP 710 may further include a graphics processing unit (GPU) and/or an ISP. The AP 710 may include at least one portion of components of electronic device 701 (e.g., a cellular module 721). The AP 710 may load a command or data received from at least one other component (e.g., non-volatile memory), and store various data in the non-volatile memory.

The communication module 720 may include the same or similar components with the communication interface 670. The communication module 720, for, example, may include the cellular module 721, a Wi-Fi module 722, a BT module 723, a GNSS module 724, a NFC module 725, MST (magnetic secure transmission) module 726, and a radio frequency (RF) module 727.

The cellular module 721 may provide a voice, a call, a video call, a short message service (SMS), or an Internet service through a communication network (e.g., LTE, LTE-A, CDMA, WCDMA, UMTS, WiBro, GSM, etc.). Further, the cellular module 721 may distinguish and authenticate electronic devices within a communication network by using a SIM 729. According to an embodiment of the present disclosure, the cellular module 721 may perform at least some of the functions which may be provided by the AP 710. For example, the cellular module 721 may perform at least some of the multimedia control functions. The cellular module 721 may include a CP.

Each of the Wi-Fi module 722, the BT module 723, the GNSS module 724, the NFC module 725, and MST module 726 may include, for example, a processor for processing data that is transmitted/received through the corresponding module. Although the cellular module 721, the Wi-Fi module 722, the BT module 723, the GNSS module 724, the NFC module 725, and MST module 726 form at least some (e.g., two or more) of the communication module 720, the Wi-Fi module 722, the BT module 723, the GNSS module 724, the NFC module 725, and MST module 726 may be included in one integrated circuit (IC) or one IC package according to an embodiment of the present disclosure. For example, at least some (e.g., the CP corresponding to the cellular module 721 and the Wi-Fi processor corresponding to the Wi-Fi module 722 of the processors corresponding to the cellular module 721, the Wi-Fi module 722, the BT module 723, the GNSS module 724, the NFC module 725, and MST module 726 may be implemented by an SoC.

The RF module 727 transmits/receives data, for example, an RF signal. The RF module 727 may include, for example, a transceiver, a power amp module (PAM), a frequency filter, a low noise amplifier (LNA), and the like. Further, the RF module 727 may further include a component for transmitting/receiving electronic waves over a free air space in wireless communication, for example, a conductor, a conducting wire, and the like. Although the cellular module 721, the Wi-Fi module 722, the BT module 723, the GNSS module 724, the NFC module 725, and MST module 726 share one RF module 727, at least one of the cellular module 721, the Wi-Fi module 722, the BT module 723, the GNSS module 724, the NFC module 725, and the MST module 726 may transmit/receive an RF signal through a separate RF module according to an embodiment of the present disclosure.

The SIM 729 may be a card including a SIM and may be inserted into a slot formed in a portion of the electronic device. The SIM 729 may include unique identification information (e.g., integrated circuit card identifier (ICCID)) or subscriber information (e.g., international mobile subscriber identity (IMSI)).

The memory 730 may include an internal memory 732 or an external memory 734. The internal memory 732 may include, for example, at least one of a volatile memory (e.g., a random access memory (RAM), a dynamic RAM (DRAM), a static RAM (SRAM), a synchronous dynamic RAM (SDRAM), and etc.), and a non-volatile Memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and etc.).

According to an embodiment of the present disclosure, the internal memory 732 may be a solid state drive (SSD). The external memory 734 may further include a flash drive, for example, a compact flash (CF), a secure digital (SD), a micro-SD, a mini-SD, an extreme digital (xD), or a memory stick. The external memory 734 may be functionally connected to the electronic device 701 through various interfaces. The electronic device 701 may further include a storage device or storage medium such as a hard drive.

The sensor module 740 measures a physical quantity or detects an operation state of the electronic device 701, and converts the measured or detected information to an electronic signal. The sensor module 740 may include, for example, at least one of a gesture sensor 740A, a gyro sensor 740B, an atmospheric pressure (e.g., barometric) sensor 740C, a magnetic sensor 740D, an acceleration sensor 740E, a grip sensor 740F, a proximity sensor 740G, a color sensor 740H (e.g., red, green, and blue (RGB) sensor), a biometric sensor 740I, a temperature/humidity sensor 740J, an illumination (e.g., light) sensor 740K, and an ultraviolet (UV) sensor 740M. Additionally or alternatively, the sensor module 740 may include, for example, an E-nose sensor, an electromyography (EMG) sensor, an electroencephalogram (EEG) sensor, an electrocardiogram (ECG) sensor, an photoplethysmogram (PPG) sensor, an infrared (IR) sensor, an iris sensor, a fingerprint sensor, etc. The sensor module 740 may further include a control circuit for controlling one or more sensors included in the sensor module 740.

The input device 750 includes a touch panel 752, a (digital) pen sensor 754, a key 756, and an ultrasonic input device 758. The touch panel 752 may recognize a touch input in at least one type of a capacitive type sensor, a resistive type sensor, an infrared type sensor, and an acoustic wave type sensor. The touch panel 752 may further include a control circuit. For the capacitive type sensor, the touch panel 752 may recognize proximity as well as a direct touch. The touch panel 752 may further include a tactile layer. In this event, the touch panel 752 provides a tactile reaction to the user.

The (digital) pen sensor 754 may be implemented, for example, using a method identical or similar to a method of receiving a touch input of the user, or using a separate recognition sheet. The key 756 may include, for example, a physical button, an optical key, or a key pad. The ultrasonic input device 758 is a device which may detect an acoustic wave by a microphone 788 of the electronic device 701 through an input means generating an ultrasonic signal to identify data and may perform wireless recognition. According to an embodiment of the present disclosure, the electronic device 701 may receive a user input from an external device (e.g., a computer or a server) connected to the electronic device 701 by using the communication module 720.

The display module 760 includes a panel 762, a hologram device 764, and a projector 766. The panel 762 may be, for example, an LCD or an active matrix OLED (AM-OLED). The panel 762 may be implemented to be, for example, flexible, transparent, or wearable. The panel 762 may be configured by the touch panel 252 and another module. The hologram device 764 may show a stereoscopic image in the air by using interference of light. The projector 766 may project light on a screen to display an image. For example, the screen may be located inside or outside the electronic device 701. According to an embodiment of the present disclosure, the display 760 may further include a control circuit for controlling the panel 762, the hologram device 764, and the projector 766.

The interface 770 includes, for example, an HDMI 772, a USB 774, an optical interface 776, and a D-subminiature (D-sub) 778. The interface 770 may be included in, for example, the communication interface 670. Additionally or alternatively, the interface 770 may include, for example, a mobile high-definition link (MHL) interface, an SD card/multi-media card (MMC), or an Infrared Data Association (IrDA) standard interface.

The audio module 780 may bi-directionally convert a sound and an electronic signal. At least some components of the audio module 780 may be included in, for example, the input/output interface 650. The audio module 780 processes sound information input or output through, for example, a speaker 782, a receiver 784, an earphone 786, the microphone 788, etc.

The camera module 791 may be a device which may photograph a still image and a video. According to an embodiment of the present disclosure, the camera module 791 may include one or more image sensors (e.g., a front sensor or a back sensor), an ISP, or a flash (e.g., an LED or xenon lamp).

The power managing module 795 manages power of the electronic device 701. The power managing module 795 may include, for example, a power management integrated circuit (PMIC), a charger IC, or a battery gauge.

The PMIC may be mounted to, for example, an integrated circuit or an SoC chip. A charging method may be divided into wired and wireless methods. The charger IC may charge a battery, and prevent over voltage or over current from flowing from a charger. According to an embodiment of the present disclosure, the charger IC may include a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier and the like may be added.

The battery gauge may measure, for example, a remaining quantity of the battery 796, or a voltage, a current, or a temperature during charging. The battery 796 may store or generate electricity, and supply power to the electronic device 601 by using the stored or generated electricity. The battery 796 may include a rechargeable battery or a solar battery.

The indicator 797 may show a particular status of the electronic device 701 or a part (e.g., AP 710) of the electronic device 701, for example, a booting status, a message status, a charging status, etc. The motor 798 converts an electrical signal to a mechanical vibration. The electronic device 701 may include a processing unit (e.g., GPU) for supporting a module TV. The processing unit for supporting the mobile TV may process, for example, media data according to a standard of digital multimedia broadcasting (DMB), digital video broadcasting (DVB), media flow, and etc.

Each of the components of the electronic device according to various embodiments of the present disclosure may be implemented by one or more components, and the name of the corresponding component may vary depending on a type of the electronic device. The electronic device may include at least one of the above described components, components may be omitted, or additional components may be further included. Also, some of the components of the electronic device may be combined to form a single entity, and thus may equivalently execute functions of the corresponding components before being combined.

An electronic device according to various embodiments of the present disclosure includes a camera module including a camera device configured to rotate based a first direction perpendicular to an optical axis, a first rotation support configured to support so that the first direction becomes a central axis for rotating the camera device, and a FPCB configured to connect the camera device and the first rotation support physically at two or more separate points. The cross sectional shape of the camera module shown in the direction of the center point of the central axis is configured so that line segments connecting the center point to the two or more separate points and the cross sectional shape of the flexible circuit board form a closed loop, and at least one line segment connecting two random points in the closed loop passes the outer part of the closed loop.

According to various embodiments of the present disclosure, a drive load of a circuit board connected to a camera module having an OIS function can be reduced when the camera module is driven.

According to various embodiments of the present disclosure, the power consumption can be reduced and the sensitivity of an actuator can be improved by reducing the drive load of the circuit board.

According to various embodiments of the present disclosure, the space limitation of an electronic device may be overcome in the electronic device having miniaturization and light weight characteristics.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure as defined in the appended claims and their equivalents.

What is claimed is:

1. A camera module providing an optical image stabilization (OIS) function, the camera module comprising:
   a camera device configured to rotate in a first direction perpendicular to an optical axis;
   a first rotation support configured to provide support so that the first direction becomes a central axis for rotating the camera device; and
   a flexible printed circuit board (FPCB) configured to connect the camera device and the first rotation support physically at two or more separate points,
   wherein a shape of a cross section of the camera module in the direction of the central axis forms a closed loop,
   wherein the cross section of the camera module is configured with a cross section of the camera device, a cross section of the first rotation support, and a cross section of the flexible minted circuit board, and
   wherein a line segment connecting two random points in the closed loop passes outside of the closed loop.

2. The camera module of claim 1, wherein the cross section of the flexible printed circuit board comprises at least one curve point.

3. The camera module of claim 2, wherein the curve point applies an elasticity to the camera device.

4. The camera module of claim 1, further comprising:
   a second rotation support configured to provide support so that a second direction perpendicular to the first direction and the optical axis becomes a central axis for rotating the camera device.

5. The camera module of claim 4, wherein the camera device rotates in the second direction.

6. The camera module of claim 4, wherein the first rotation support comprises a first support connecting to a first hinge formed in the second rotation support.

7. The camera module of claim 6, wherein the second rotation support comprises a second support connecting to a second hinge formed in the camera device.

8. The camera module of claim 1, further comprising:
   an actuator configured to provide a rotational drive power to the camera device.

9. The camera module of claim 8, wherein the actuator comprises at least one of a voice coil motor (VCM), a step motor, a piezo motor, and a capacitance-type actuator.

10. The camera module of claim 9, wherein the capacitance-type actuator comprises at least two opposite electrodes.

11. An electronic device comprising:
    a camera module comprising a camera device configured to rotate in a first direction perpendicular to an optical axis, a first rotation support configured to provide support so that the first direction becomes a central axis for rotating the camera device, and a flexible printed circuit board (FPCB) configured to connect the camera device and the first rotation support physically at two or more separate points,
    wherein a shape of a cross section of the camera module in the direction of the central axis forms a closed loop,
    wherein the cross section of the camera module is configured with a cross section of the camera device, a cross section of the first rotation support, and a cross section of the flexible printed circuit board, and
    wherein a segment connecting two random points in the closed loop passes outside of the closed loop.

12. The electronic device of claim 11, wherein the cross section of the flexible printed circuit board comprises at least one curve point.

13. The electronic device of claim 12, wherein the curve point applies an elasticity to the camera device.

14. The electronic device of claim 11, further comprising:
    a second rotation support configured to provide support so that a second direction perpendicular to the first direction and the optical axis becomes a central axis for rotating the camera device.

15. The electronic device of claim 14, wherein the camera device rotates in the second direction.

16. The electronic device of claim 14, wherein the first rotation support comprises a first support connecting to a first hinge formed in the second rotation support.

17. The electronic device of claim 16, wherein the second rotation support comprises a second support connecting to a second hinge formed in the camera device.

18. The electronic device of claim 11, further comprising:
    an actuator configured to provide a rotational drive power to the camera device.

19. The electronic device of claim 18, wherein the actuator comprises at least one of a voice coil motor (VCM), a step motor, a piezo motor, and a capacitance-type actuator.

20. The electronic device of claim 19, wherein the capacitance-type actuator comprises at least two opposite electrodes.

* * * * *